US009922355B2

(12) United States Patent
Mezan et al.

(10) Patent No.: US 9,922,355 B2
(45) Date of Patent: Mar. 20, 2018

(54) SYSTEM, PLATFORM AND METHOD FOR SHARED ORDER MANAGEMENT

(71) Applicant: SIMPLE ORDER LTD., Tel Aviv (IL)

(72) Inventors: Arik Mezan, Tel Aviv (IL); Amir Zelig, Tel Aviv (IL); Guy Even Ezra, Herzliya (IL); Elliott Hool, Herzliya (IL)

(73) Assignee: SIMPLE ORDER LTD., Tel Aviv (IL)

( * ) Notice: Subject to any disclaimer, the term of this patent is extended or adjusted under 35 U.S.C. 154(b) by 746 days.

(21) Appl. No.: 14/322,704

(22) Filed: Jul. 2, 2014

(65) Prior Publication Data

US 2015/0012374 A1 Jan. 8, 2015

Related U.S. Application Data

(60) Provisional application No. 61/842,400, filed on Jul. 3, 2013.

(51) Int. Cl.
*G06Q 30/06* (2012.01)

(52) U.S. Cl.
CPC ..... *G06Q 30/0605* (2013.01); *G06Q 30/0603* (2013.01)

(58) Field of Classification Search
None
See application file for complete search history.

(56) References Cited

U.S. PATENT DOCUMENTS

| | | | | |
|---|---|---|---|---|
| 6,269,343 B1 * | 7/2001 | Pallakoff | ............... | G06Q 30/02 705/26.2 |
| 6,604,089 B1 * | 8/2003 | Van Horn | .............. | G06Q 30/06 705/26.2 |
| 7,194,427 B1 * | 3/2007 | Van Horn | .......... | G06Q 30/0605 705/26.2 |
| 7,424,445 B1 * | 9/2008 | Cue | ........................ | G06Q 30/06 705/26.2 |
| 7,480,627 B1 * | 1/2009 | Van Horn | ............ | G06Q 10/087 705/14.16 |

(Continued)

OTHER PUBLICATIONS

Anon., "Catalog City and R.R. Donnelley Anounce Joint Sales Agreement for Online Catalog Commerce," PR Newswire, Aug. 24, 1998, 0824CGM030.*

(Continued)

*Primary Examiner* — Nicholas D Rosen
(74) *Attorney, Agent, or Firm* — Symbus Law Group, LLC; Clifford D. Hyra

(57) ABSTRACT

There is provided, in accordance with an embodiment of the present invention, a system, platform and method to provide shared order management based on a shared order platform used by buyers and suppliers. In some embodiments the order management platform includes an order server in a communications cloud, coupled to an order database; a shared order platform adapted to facilitate usage by one or more authorized buyers and/or suppliers, wherein the shared order platform includes a shared structured document with order related data layers; and a tokenized link with an address linking to the shared order platform, where the tokenized link is adapted to allow entry into the shared order platform via entering a page defined within the tokenized link.

7 Claims, 3 Drawing Sheets

(56) References Cited

U.S. PATENT DOCUMENTS

| | | | | |
|---|---|---|---|---|
| 8,639,550 | B2* | 1/2014 | Loring | G06Q 10/0631 |
| | | | | 705/7.13 |
| 9,015,574 | B2* | 4/2015 | Rickabaugh | G06F 17/2247 |
| | | | | 715/224 |
| 9,215,065 | B2* | 12/2015 | Xiques | H04L 9/083 |
| 9,547,665 | B2* | 1/2017 | Wood | G06F 17/30165 |
| 2004/0267630 | A1* | 12/2004 | Au | G06Q 30/06 |
| | | | | 705/80 |
| 2005/0114257 | A1* | 5/2005 | Penney | G06Q 40/04 |
| | | | | 705/37 |
| 2008/0262920 | A1* | 10/2008 | O'Neill | G06Q 30/02 |
| | | | | 705/14.27 |
| 2010/0312696 | A1* | 12/2010 | Sinha | G06Q 20/102 |
| | | | | 705/40 |
| 2012/0116830 | A1* | 5/2012 | Loring | G06Q 10/0631 |
| | | | | 705/7.14 |
| 2012/0233532 | A1* | 9/2012 | Rickabaugh | G06F 17/243 |
| | | | | 715/209 |
| 2013/0110892 | A1* | 5/2013 | Wood | G06F 17/30165 |
| | | | | 707/827 |
| 2013/0219178 | A1* | 8/2013 | Xiques | H04L 9/083 |
| | | | | 713/168 |

OTHER PUBLICATIONS

Anon., "Revenew, Creator of The Marketing Network, Secures Series B Venture Capital Funding: Revenew is transforming channel marketing with its license-free cloud technology, enabling companies to share contest, data and funds with their resellers," PR Newswire, Oct. 30, 2013.*

* cited by examiner

_US 9,922,355 B2_

SYSTEM, PLATFORM AND METHOD FOR SHARED ORDER MANAGEMENT

CROSS REFERENCE TO RELATED APPLICATIONS

This application claims priority from U.S. Provisional Patent Application No. 61/842,400, filed 3 Jul. 2013, entitled "A METHOD AND SYSTEM FOR CONNECTING PARTICIPANTS ON THE SUPPLY CHAIN FOR THE PURPOSE OF CREATING COHERENT DATA", which is incorporated in its entirety herein by reference.

FIELD OF THE INVENTION

The present invention relates in general to methods and devices useful in supply chain management.

BACKGROUND OF THE INVENTION

The state of the art today for managing a supply chain generally requires substantial manual configuration. Typically, customers communicate with their established suppliers in a very personal manner. For example, a customer usually calls the regular supplier of a particular commodity or standard set of items and orders a desired quantity of goods. Some customers/retailers send SMS messages, facsimile transmissions or emails with the request. Each new order typically generates three or four different documents: An order, a delivery note, an invoice and a credit note.

Generally an order may be in the form of a non-editable notification, whether a paper note or a .PDF format file is sent from client to supplier. In some cases a client fills out web-form e.g. to online supplier, OR order is delivered verbally over the phone or sent via SMS.

A paper Delivery/Invoice notice typically arrives together with package either in the post or with the delivery service which is not a postal service. Some delivery services require electronic signature upon delivery. Direct/Online purchases result in immediate non-editable webpage which is confirmation of the sale. An Invoice is usually supplied in the mail together with the mail order (i.e. the purchases item) or with the delivery. With direct deliveries between a supplier and customer (possibly a retailer), the differences between the actual delivery and Delivery Note/Invoice are typically marked in writing over the Delivery Note/Invoice.

The seller (supplier) typically sends a credit note to the buyer (client) in response to returned goods, non-delivered goods, price differences or missing discounts, that where previously invoiced.

The potential for mistakes in the above processes and the subsequent paper trail that follows is great, as the respective documents are usually unorganized and are time and resource consuming to handle. In many cases, in order to better organize the data, these documents are usually inserted manually into the supplier/retailer systems (ERP, accounting systems, or Excel files), where each document is liable to exist in different versions with different data on the retailer and supplier side. Much time and many resources are invested monthly in order to settle such data inconsistencies between retailers and suppliers.

Various enterprise resource planning (ERP) and CRM systems exist to help organize and streamline the process and improve management of the supply chain, but these systems are generally expensive to setup and configure, and are owned and operated by one side of supply chain (either the supplier or the customer).

SUMMARY OF THE INVENTION

There is provided, in accordance with an embodiment of the present invention, a system, platform and method to provide shared order management and catalog management.

In accordance with some embodiments an order management platform is provided that includes an order server in a communications cloud, coupled to an order database; a shared order platform adapted to facilitate usage by one or more buyers and/or suppliers, wherein the shared order platform includes an open document with order related data layers; and a tokenized link with an address linking to the shared order platform, the tokenized link being adapted to allow entry into the shared order platform via entering a page defined within the tokenized link In some embodiments the shared order platform includes a trading catalog generated by processing (e.g., aggregation and merging etc.) of multiple shared order platforms by a common buyer and/or supplier.

In some embodiments the tokenized link has a time expiry limitation, for example, allowing entry for n times or for a limited period, to the shared order platform, and includes instructions to execute commands to enable user verification.

In some embodiments the shared order platform may include a multitude of documents related to orders, for example, multiple structured documents may be used that are coded to display multiple versions of the documents, such as to see a history of changes or modifications to respective documents.

In some embodiments the shared order platform includes an inventory tracking module or element shared by an order buyer and an order supplier.

In further embodiments one or more buyers and/or suppliers may be unregistered platform users.

In still further embodiments, the order management system may use data from multiple registered users and/or unregistered users to enable formation of a supply chain network based upon crowd data from users.

In other embodiments the platform executes code to enable generation of a crowd based catalog based on orders processed by the order server.

In accordance with some embodiments, a catalog platform is provided that includes an catalog server in a communications cloud, coupled to an catalog database; a shared catalog platform adapted to facilitate usage by one or more authorized buyers and/or suppliers, wherein the shared catalog platform includes an open catalog document with catalog related data layers; and a tokenized link with an address linking to the shared catalog platform, the tokenized link being adapted to allow entry into the open catalog document via entering a page defined within the tokenized link.

In some embodiments the open catalog document includes a trading catalog generated by aggregation of multiple shared order platforms by a common buyer and/or supplier.

In some embodiments the tokenized link is a unique link to the open catalog document, and includes instructions to execute commands to enable user verification.

In still further embodiments a catalog is generated via processing (e.g., aggregation and merging) of data provided by a crowd of end users.

In accordance with some embodiments, a method for shared order management is provided, which includes generating of an order form, by an order supplier or an order buyer; generating a tokenized link to the order form, the link being coded to allow access to a link holder; and running on an order server one or more files with instructions to execute commands to enable updating of a shared order form, the order form including data layers representing versions of order related documents, for example supply chain documents like invoices, credit/return notes, delivery notes etc.

In some embodiments the versions of orders are from both order suppliers and order buyers.

In some embodiments the method may further include running a program or set of instructions to generate an order catalog based on data input by multiple buyers.

In further embodiments the method may include running a program or set of instructions to generate an order catalog based on data input by multiple suppliers.

In still further embodiments a communication means may be used to communicate between users in a shared order form.

In still further embodiments the shared order form may be used as a communication means between users of the shared order platform.

BRIEF DESCRIPTION OF THE DRAWINGS

The principles and operation of the system, apparatus, and method according to the present invention may be better understood with reference to the drawings, and the following description, it being understood that these drawings are given for illustrative purposes only and are not meant to be limiting, wherein.

DETAILED DESCRIPTION OF THE INVENTION

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention.

According to some embodiments, retailers and suppliers may communicate about an order using a shared order platform, that includes a shared order document, shared order page or shared order form, which may be accessed through a tokenized page link. For example, such a page link may be communicated using email, SMS, an Application, or other suitable medium. In some embodiments the tokenized page link includes a coded entry to a link, optionally a unique link, that allows authorized users to enter the shared order form and edit and/or view various supply chain elements including views, history, prices, inventory, orders, invoices, catalog items, quantities, etc. Access may be for a limited time, in accordance with selected limited entry rules, opened for one time usage etc.

According to some embodiments a shared order platform functions as a dynamic, shared, live platform for enabling shared product catalog development, enhancement and management, optionally using interactive links to external data sources, shared documents, catalogs, supply chain players etc. In this way a buyer and/or supplier may generate a dynamic catalog, to be shared by supply chain partners or associates etc., whether or not these partners are registered users or members of the platform.

Figure 1:
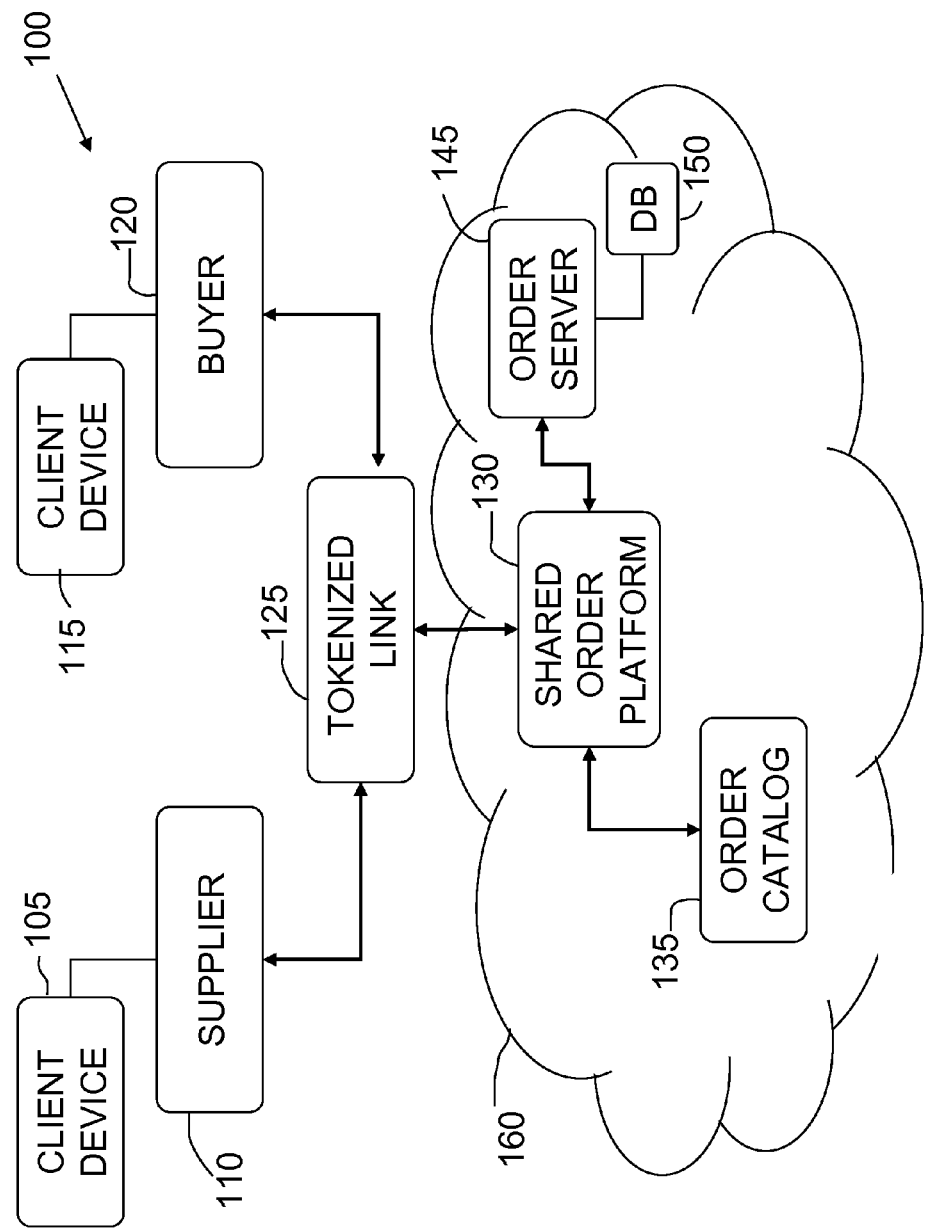
FIG. 1 is a schematic system diagram depicting components of a Supply Chain Management system, according to some embodiments.

Reference is now made to FIG. 1, which is a schematic system diagram depicting a system 100 for enhancing management of a supply chain and, more particularly, to a system and method for creating a shared order platform 130 that provides a coherent and agreed set of structured data that can be used by one or more suppliers and/or buyers, as well as by other authorized parties. Suppliers 110 and buyers 120, using connected devices 105, 115, connect to a web page or destination, which is typically accessed via a tokenized, unique and/or coded link 125, to which all or authorized users can connect in accordance with optional access rules. The tokenized link 125 links into a shared order destination, document or form, to allow users to connect with one or more customers/suppliers, for substantially real time customer relationship management (CRM), optionally without requiring both parties to register to the system or download any software. As used herein, the term "tokenized link" may refer to a web page link that may include encoded data, for example including data about the relationship between a single supplier and a single customer together, with a document type and document ID (e.g., including Supplier ID, Customer ID, Order, Order Number etc.), which may be encrypted to enhance its security, make it difficult to hack, and can be used in accordance with pre-configured restrictions (eg., accessible to specific people or sources, accessible for limited times, etc).

In some embodiments, shared order platform 130 is situated within a communications cloud 160, which connects platform 130 to an order server 145, which is in turn communicatively coupled to an order database 150. The order server 145 may allow the data processed in platform 130 to generate an order catalog(s) 135 and/or to be in communication with order catalog 140.

In some embodiments, system 100 allows both suppliers and buyers, or other relevant entities, to work on the same coherent agreed set of data, throughout the ordering and delivery process, on the initiation of either party and without requiring both parties to be registered to the system.

In some embodiments, a single registered user, whether the supplier or retailer, may initiate the creation of a whole network of non-registered suppliers and/or buyers (e.g., retailers) that can communicate using shared structured documents or forms, that may integrate documents such as catalogs, orders and invoices/delivery notes, promotions, etc., optionally accessing the structured documents using known communication tools such as email, chats, messaging etc.

Shared order platform 130 may, in some embodiments, include a shared order form or document., typically located on server or cloud that is accessible to all connected users, and may serve as a 'neutral ground' between the buyer and supplier, or other system users, such that all users entering the shared order platform may 'own' or jointly own the shared order form or other relevant shared documents, by being able to read and/or write on the form. In some embodiments limited authorization may be given to order platform users, for example, to read only, make comments, make edits, approve orders, change parameters etc. The interactive, modifiable shared order form may generally include the details of the order and possibly a catalog (e.g. belonging to the supplier) or a catalog item/list (e.g., generated by the buyer, possibly through prior interaction, or from an advert or other third party source or other buyers of the same supplier). In some embodiments the shared order platform integrates two-way communication services that may allow for personal interaction such as an online chat session, an instant messaging service (IM) or the like.

The encrypted "relationship data" in the link-to-order is the communication token. To improve security, it is possible to limit the times a single token can be used. Once expired, the recipient needs to choose a password to continue using the system or wait for the next token to come up with the next order.

In further embodiments, multiple or all orders from the same supplier may be aggregated and modified to create a 'crowd supplier catalog'. For example, if one buyer orders photocopying paper from a particular supplier and a second buyer orders staples from the same supplier and a third buyer orders pens, then the system identifies that the supplier in question has a catalog of at least paper, staples and pens. In the other direction, if multiple suppliers supply items to a single buyer, the system may combine the orders for the same buyer, and create a "crowd buyer catalog" related to the specific buyer. In still further embodiments multiple orders from multiple suppliers and/or buyers may be aggregated to form crowd catalogs. In some examples such crowd catalogs may be generated for specific or selected areas, segments, industries, locations, etc., or using other relevant criteria for filtering related buyers and/or suppliers.

Figure 2:
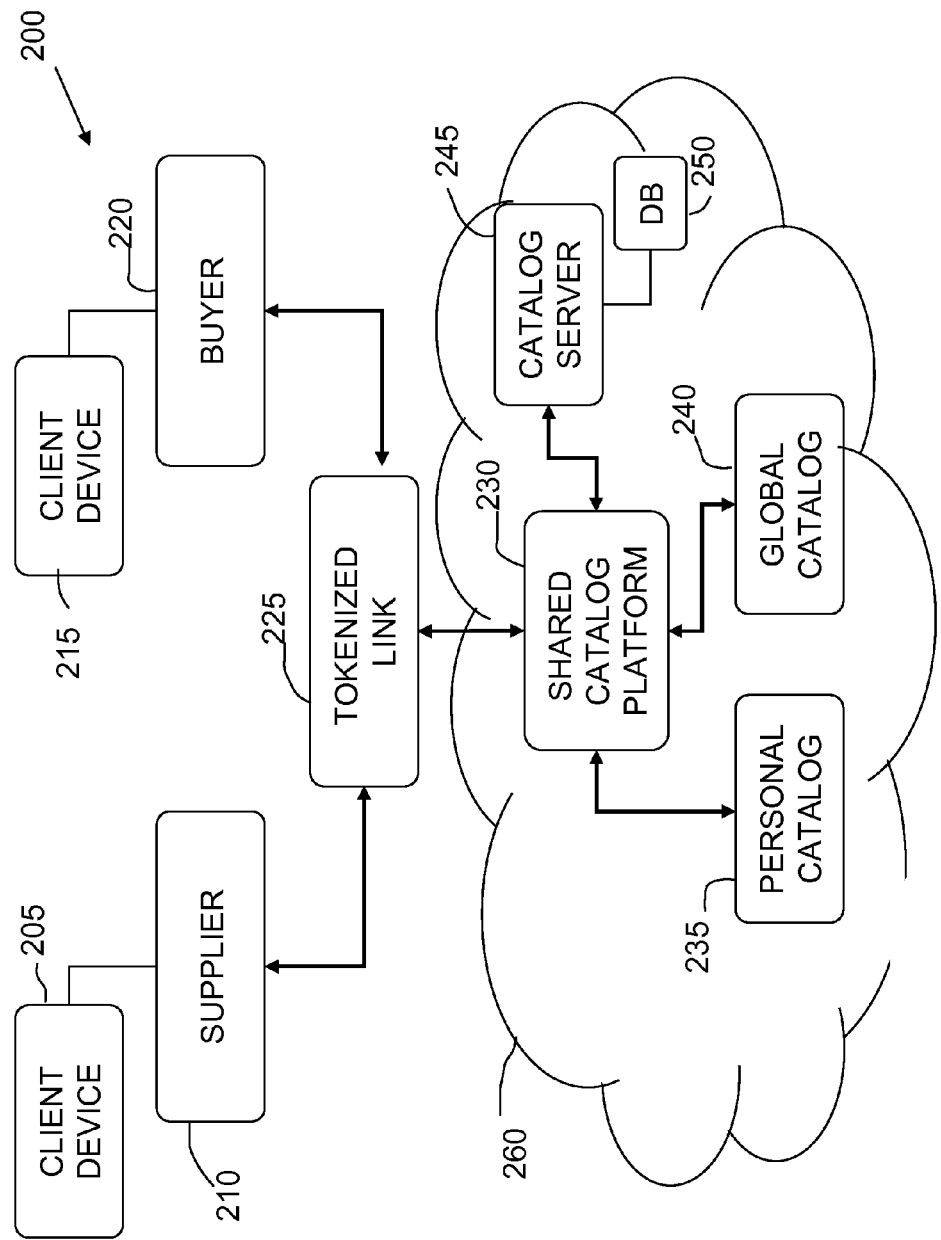
FIG. 2 is a schematic system diagram depicting components of a Catalog Management system, according to some embodiments.

Reference is now made to FIG. 2, which is a schematic system diagram depicting a system 200 and method for creating a shared catalog platform 230 based set of order data between one or more suppliers and/or buyers. Suppliers 210 and buyers 220, using connected devices 205, 215, connect to a tokenized link 225, to which all or authorized users can connect in accordance with access rules. The tokenized link 225 links into a shared dynamic document, hereinafter referred to as a shared catalog platform 230, to allow users to connect with their network of customers/suppliers, for substantially real time customer relationship management (CRM), optionally without requiring both parties to register to the system or download any software.

In some embodiments, shared catalog platform 230 is situated within a communications cloud 260, which connects platform 230 to a catalog server 245, which is in turn communicatively coupled to a catalog database 150, which will store order related data. The catalog server 245 may allow the data processed in platform 230 to generate personal order catalog(s) 235 (for example, a catalog generated by a seller or buyer), and/or to generate global order catalog(s) 235 (for example, a system based catalog generated by multiple, not necessarily registered sellers and/or buyers). Catalog server may further be in substantially real time communication with personal order catalog(s) 235 and/or global order catalog(s) 235. In some embodiments generated catalogs may include, for example, customer/seller products and/or services, customized product lists (varieties), pricing levels etc. Even in such cases where crowd data is merged into a single global catalog, each of the crowd data providers (e.g., buyers that created personal catalogs) will be exposed to his/her own personal data and pricing levels etc., thereby enabling users to maintain and manage their parts of their shared catalog platforms.

Figure 3:
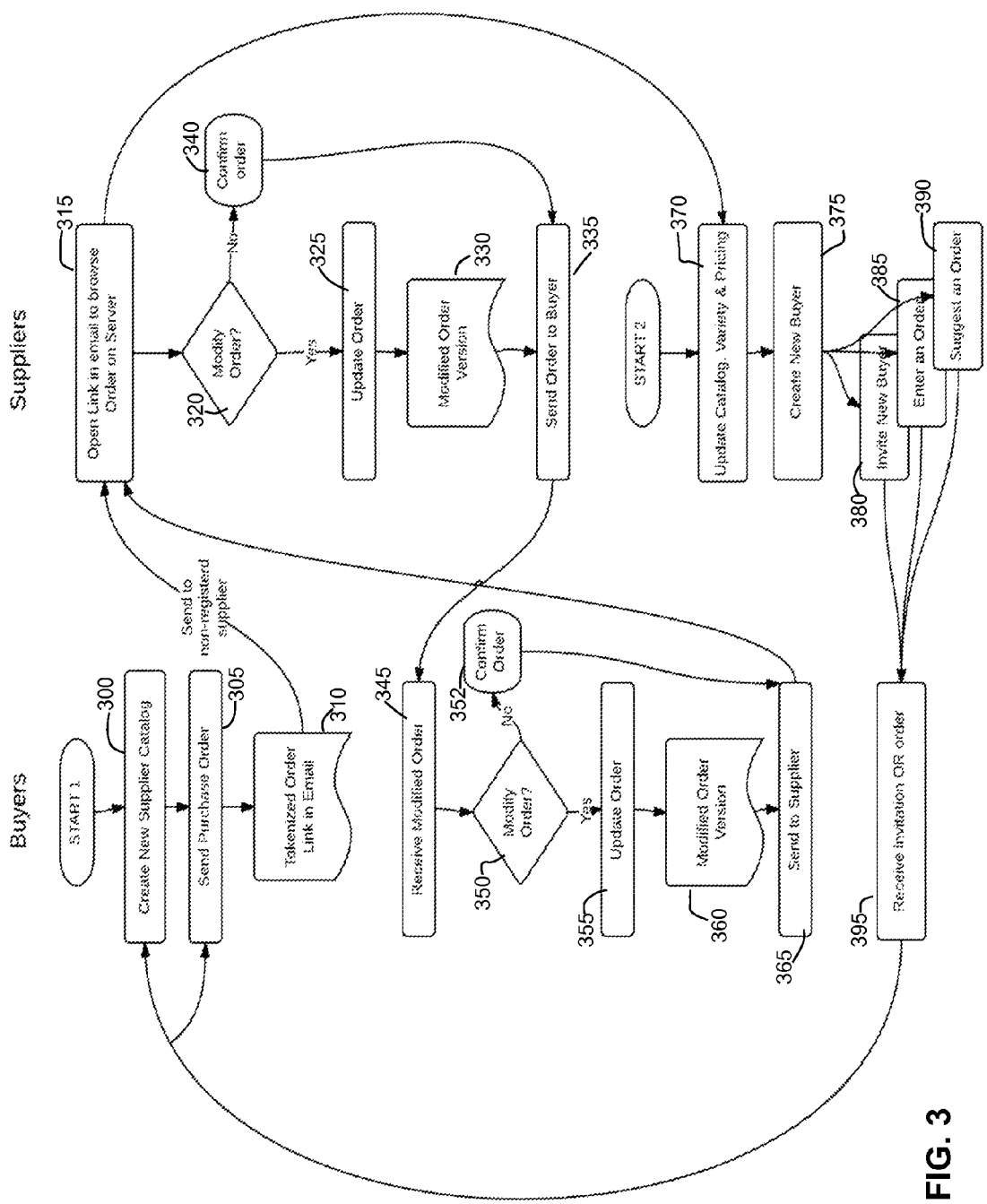
FIG. 3 is a flow diagram indicating the process by which shared supply chain management may be implemented, according to some embodiments.

Reference is now made to FIG. 3, which is a flow diagram indicating a process for creating a shared order platform that provides a coherent and agreed set of data between one or more suppliers and/or buyers. As can be seen in the figure, at start scenario 1, at step 300, on the buyers side, an initiating, registered party creates an electronic purchase order, for example on a webpage or alternative document in a shareable communications cloud, data server etc. In some embodiments, at step 305, the initiating buyer may generate a new supplier catalog of wanted order items, whether for one or more, and specific or non-specific suppliers. At step 310 the buyer sends the purchase order and/or the generated catalog to any other party, registered or non-registered, via email/text/messaging etc. as a secured encrypted tokenized webpage link, wherein the secured encrypted link may include, for example, user identification and other vital information for directing the receiving party to a shared platform, destination or form, where the sending and receiving parties may be connected, in relation to the purchase order.

At step 315 the link may be clicked on or otherwise opened, thereby directing the recipient to a shared order platform, that may include an open web form (order form) containing an interactive, modifiable, electronic order and optionally, online two-way communication services between both parties. At step 320 the order (form) may be modified by the supplier, for example, according to their ability to provide the order. At step 325, if the order was modified, it may be updated in the system, or on the form. At step 330 the modified order may be saved as a new version, and optionally the previous versions may also be viewed, similar to a "track changes" type mechanism, where various changes and versions can be viewed for multiple users. At step 335 the modified order is sent to the buyer. At step 340 if the supplier confirms the order "as is", then the order may be processed, and confirmation may be sent back to the buyer at step 335. In this way, the buying or initiating party is either notified substantially in real time about the receiving party's activities, or is made aware of it on next entering into the form.

At step 345 the buying party can choose to confirm, reject or modify the edited form, and the process may recur until both parties confirm the order. At step 350, the buyer may choose to modify the edited form, which will update the order at step 355. The updated order will be saved as a modified version of the order at step 360, which will be sent back to the supplier at step 365. In the case where the buyer chooses to confirm the updated order, the order is confirmed at step 352, and optionally returned to the supplier to carry out the order. The communication loop between the buyer and supplier may continue until one of the sides confirms the order for execution, or cancels the order etc.

In another embodiment, the process may begin from the supplier side, at start 2 or be a follow-on process from an order received by the supplier in step 315, optionally without registering to the system. At step 370 a supplier may enter or upload on the system a product or item offering, or catalog of offerings. This offering may generally include item details, varieties, prices, numbers, specifications etc. At step 375 the supplier may enter or create one or more new buyers, which may be for example, existing, potential, registered or non-registered buyers, for which the supplier has a connection. For example, at step 380 an invitation for a new buyer may be prepared, for example, which invites the potential buyer to see the offering, optionally via a link sent to the buyer's email, mobile number, or other linkage medium. At step 385 the supplier may enter an order to modify, polish or confirm the order etc. At step 390 the supplier may suggest an order, for example, by customizing the order, making suggestions, referring to a catalog etc. At step 395 the invitation or order may be received by the potential buyer, who may then, at step 300 use the order to create a catalog, and/or at 350, the buyer may choose to confirm or modify the order.

According to some embodiments, the system may process delivery notes, invoices, credit/return notes etc. issued by the parties with respect to the same order, in the shared order form. In this way the shared order form may also function as a platform for delivery note management, order invoice management, inventory tracking management etc.

According to some embodiments, registered and/or non-registered parties can use the shared order form as a communication mean, and as a means to share order data, such as order history, past orders placed between the parties, catalogs and pricing, view reports of the relationships, post promotions and special offers, chat, etc.

In some embodiments, a registered and/or non-registered party can use the order link to present all the orders received by a supplier from different customers and/or all orders supplied to a buyer from different suppliers.

In further embodiments the system may enable generation of global database based on different orders from a supplier ("crowd catalog", discussed above). In one embodiment a suppliers catalog may be generated only if authorized by a supplier. In one such example a supplier may take ownership of all orders from them by various buyers, optionally based on all orders from the suppliers' email address or messaging address, and release a derived suppliers catalog if and when they desire. In other embodiments, each retailer may own its own personal supplier catalog. In an example of a case where the supplier does not permit using of related order data to form a global catalog, the system may use the order data to create a shared catalog template that may be used as a template for creating additional personal catalogs, but with no reference to the supplier (i.e., owner of the email address). In such a case, buyers wanting to create a supplier catalog may be required to assign a real contact to the supplier entity that was created from the aggregated template.

In one example a global catalog for a supplier may be generated based on crowd sourcing, without any contribution from the supplier. Such a catalog may be made available to new users or specified group of users. In some embodiments the system allows for flexible catalog generation based on matches between personal catalogs and the global catalog.

In still further embodiments, as can be seen on FIG. 3, a supplier can work with multiple buyers, and a buyer can work with multiple suppliers. In this way the order management system can use crowd data to connect a registered user to new buyers and/or suppliers, and thereby enhance or expand their supply chain network, based on a global supply chain network generated by the system.

In further embodiments the crowd generated catalogs may be used to generate recommended prices, deals, problems, new suppliers or buyers etc.

In further embodiments the system can provide aggregated reports to suppliers and/or buyers.

In further embodiments shared order form contains a two way communication capability (e.g. chat, email, IM, Skype™, Whatsapp™ etc.), as well as the other capabilities described above.

According to some embodiments, "tokenized" or non-tokenized web page links may be used to include required purchase order encoded data.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A shared catalog system, comprising:
a catalog server in a communications cloud, coupled to a catalog database;
a shared catalog platform adapted to facilitate usage by one or more authorized buyers and/or suppliers, wherein said shared catalog platform includes an open catalog document with catalog related data layers; and
a tokenized link with an address linking to said shared catalog platform, said tokenized link being adapted to allow entry into said open catalog document via entering a page defined within said tokenized link.

2. The catalog system of claim 1, where said open catalog document includes a trading catalog generated by aggregation and merging of multiple shared catalog platforms provided by a common buyer and/or supplier.

3. The catalog system of claim 1, where said tokenized link has time expiry limitation limiting access to said open catalog document, said link including instructions to execute commands to enable user verification.

4. The catalog system of claim 1, where a catalog is generated via aggregation and merging of data provided by a crowd of end users.

5. A method for enabling shared order management, comprising:
generating of a shared order form, by an order supplier or an order buyer;
generating a tokenized link to said shared order form, said link being coded to allow access to authorized parties for authorized usage; and
running on an order server one or more files with instructions to execute commands to enable updating of said shared order form, said shared order form including data layers representing versions of orders relating to said shared order form.

6. The method of claim 5, wherein said versions of orders are from both order suppliers and order buyers.

7. The method of claim 5, further comprising using a communication means to communicate between users of the shared order form.

* * * * *